United States Patent

Danell et al.

[15] 3,639,687

[45] Feb. 1, 1972

[54] ARRANGEMENT FOR VIDEO SIGNAL TRANSMISSION AT A PICTURE TELEPHONE CONNECTION

[72] Inventors: Curt Danell, Johanneshov; Nils Olof Johannesson, Bandhagen, both of Sweden

[73] Assignee: Telefonaktiebolaget LM Ericsson, Stockholm, Sweden

[22] Filed: Sept. 4, 1969

[21] Appl. No.: 855,166

[30] Foreign Application Priority Data

Oct. 9, 1968 Sweden ....................13597/68

[52] U.S. Cl. ....................178/6, 178/DIG. 3

[51] Int. Cl. ....................H04h 7/12

[58] Field of Search ....................178/6, DIG. 3, DIG. 1; 179/15.55; 333/14

[56] References Cited

UNITED STATES PATENTS

| | | | |
|---|---|---|---|
| 3,497,721 | 2/1970 | Dexter | 333/14 |
| 3,458,815 | 7/1969 | Becker | 333/74 |
| 3,444,469 | 5/1969 | Miyagi | 333/14 |
| 3,333,055 | 7/1967 | Krause | 178/6 |
| 2,850,574 | 9/1958 | Kretzmer | 178/6 |
| 2,717,931 | 9/1955 | Duke | 178/DIG. 1 |
| 1,948,973 | 2/1954 | Steinberg | 179/15.55 |

*Primary Examiner*—Robert L. Griffin
*Assistant Examiner*—Barry Leibowitz
*Attorney*—Hane & Baxley

[57] ABSTRACT

An arrangement in a picture telephone connection for obtaining optimal quality of the picture both when the connection is used for transmitting a picture of an object which only requires a sharp contrast for example a page of text and when the connection is used for transmitting a picture of an object which requires a wider range of different light intensities for example a face. In the first case the video signal is compressed in a compressing amplifier in the transmitter and supplied to the transmission medium leading to the receiver via a low-pass filter having a steep transition from passband to suppressed band and an expanding corresponding to the compression is carried out in the receiver. In the second case the video signal is supplied to the transmission medium uncompressed via a low-pass filter having a flat transition from passband to suppressed band.

1 Claims, 4 Drawing Figures

INVENTORS:
CURT DANELL
NILS OLOF JOHANNESSON
BY: Hane and Baxley
ATTORNEYS

INVENTORS:
CURT DANELL
NILS OLOF JOHANNESSON
BY: Hane and Baxley
ATTORNEYS

ARRANGEMENT FOR VIDEO SIGNAL TRANSMISSION AT A PICTURE TELEPHONE CONNECTION

The present invention relates to an arrangement for video signal transmission in a picture telephone connection which includes a transmitter and a receiver. The transmitter includes an arrangement for generating firstly a video signal, whose amplitude at different times represents the light intensity in different points of the picture object and secondly a synchronizing signal for synchronization of the video signal generated by the transmitter with the picture generating signal at the receiver. Both of the signals generated in the transmitter are fed to different inputs of an adding circuit whose output is connected to a transmission medium leading to the receiver via a first low-pass filter having a flat transition from passband to suppressed band. The receiver including a discriminator at which the synchronizing signal is separated from the video signal so that the video signal and the synchronizing signal are separately supplied to a picture reproduction arrangement in the receiver.

For economic reasons the frequency range used for video signal transmission in picture telephone connections must be made very small compared with the frequency range used e.g., in television links. This is achieved by filtering the generated video signal through a low-pass filter, the limiting frequency of which determines the frequency range. The filtered signal is then shifted to a desired frequency band by means of some suitable modulation procedure. The low-pass filtering is performed by a filter with relatively flat transition from passband to suppressed band. Filters with a steep transition namely give rise to overshoot signals for fast changes of the amplitude of the filtered signal which can result in unwanted effects in the receiver. However when using a filter with a flat transition from passband to suppressed band a poorer resolution of the picture is obtained, i.e., sharp transitions from black to white will not be present in the receiver. This means that the video signal transmission cannot be used for transmission of, for example, a page of text whose picture reproduction requires good resolution. An object of the present invention is therefore to provide an arrangement in a picture telephone connection in which pictures with good resolution are transmitted. The characteristics of the invention will appear from the appended claims.

Figure 1A:
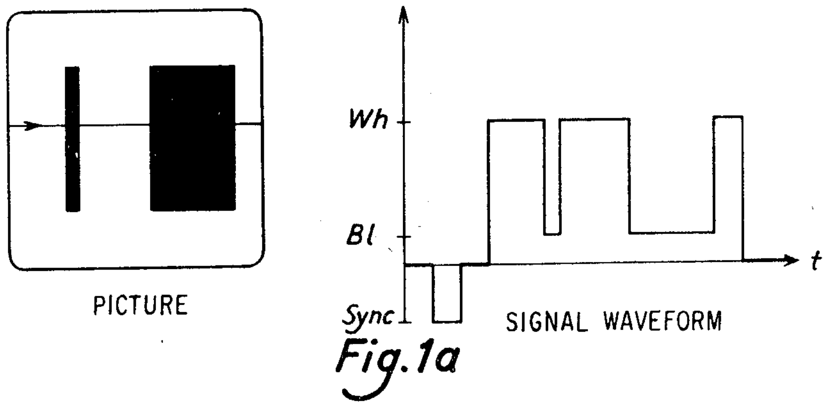
Figure 1B:
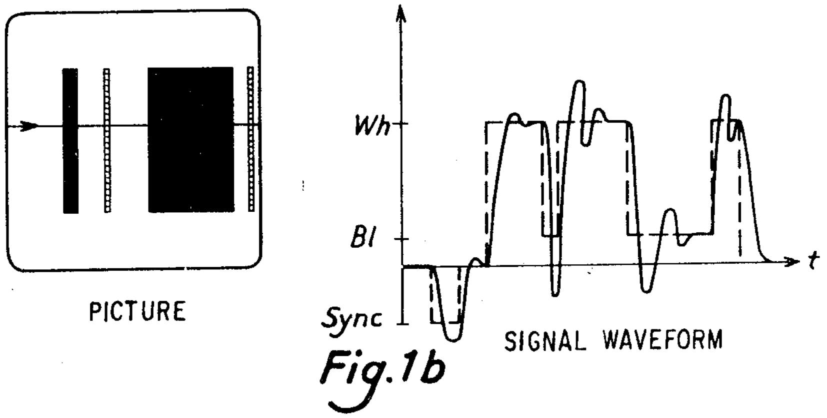
Figure 1C:
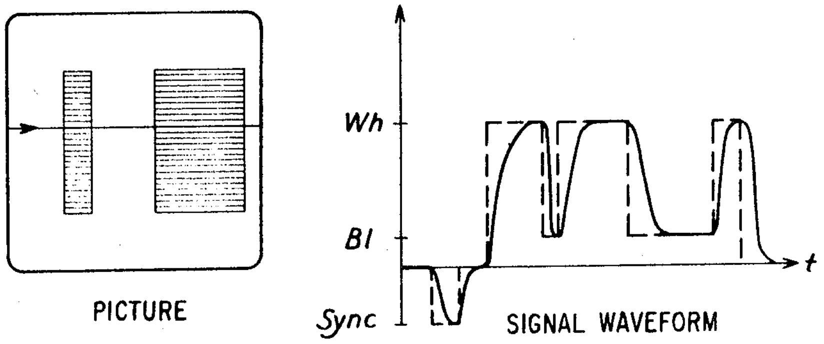
Figure 2:
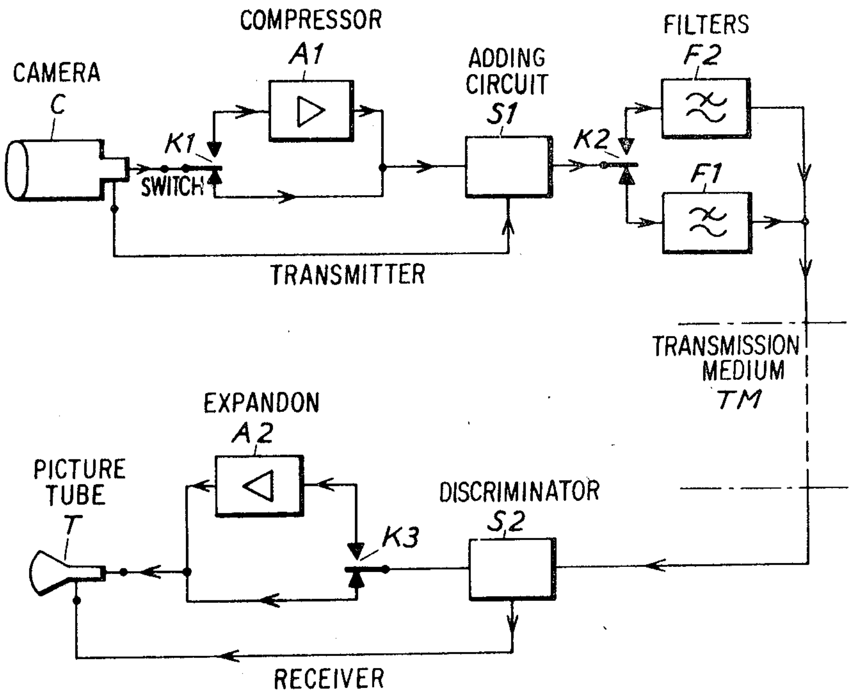

The invention will be explained more in detail with reference to the accompanying drawing in which FIG. 1 shows the video signal obtained by the use of low-pass filters with different characteristic and FIG. 2 shows a block diagram of an arrangement according to the invention.

In FIG. 1*a* there is shown to the left an elementary picture object consisting only of two black fields against a white background. From this picture object a video signal is produced by scanning the picture horizontally from the left to the right. Such a scanning is indicated by an arrow in the Figure and the video signal obtained for the scanning is shown to the right in FIG. 1*a*. It is assumed that the necessary synchronizing signal for picture reproduction at the receiver is obtained before the scanning in form of a negative pulse at a level indicated by Sync. It is also assumed that the white parts of the picture give rise to signals with the amplitude Wh and the black parts give rise to signals with the amplitude B1, whereby the showed signal is obtained. This signal, covers as is realized, an infinite frequency range and it is therefore necessary to low-pass filter the signal so that the higher frequencies are eliminated, as the signal otherwise after frequency transforming to a certain frequency band would disturb signals in adjacent frequency bands.

In FIG. 1*b* the continuous curve in the diagram shows the signal which is obtained if the video signal according to FIG. 1*a* is filtered in a low-pass filter with steep transition from passband to suppressed band, in the diagram even the primary signal is indicated. As appears from the diagram the quick changes between the amplitudes Wh and B1 will be reproduced relatively well but every change is followed by an overshoot signal. If the amplitudes of the overshoot signals are sufficiently large two unwanted phenomena arise in the receiver. The overshoot signals can, namely, on the one hand give rise to negative signals which can be mistaken for synchronizing pulses and on the other entail that, for example, at a change from black to white picture field a grey line is obtained. This is indicated in the left part of FIG. 1*b* which shows the picture obtained at the receiver side after the low-pass filtering. In order to eliminate both the false synchronizing pulses and the grey lines a low-pass filter with a flatter transition from passband to suppressed band is usually used. The obtained output signal for such a filter is shown by the continuous curve in FIG. 1*c* where even the primary signal is shown (broken curve). As appears from the diagram the overshoot signals disappear. However, considerably longer rise and fall times of output signal are obtained causing the sharp picture outlines to be rubbed out. If the picture object consists of, for example a face, this effect is not harmful, while on the contrary the picture of a page of text can be transmitted satisfactorily with this bad resolution. According to the invention is it however possible to utilize the advantages which are obtained with a filter with steep transition from passband to suppressed band as well as the advantages which are obtained for a filter with flat similar transition. How this is carried out will appear from FIG. 2.

In FIG. 2 a camera tube C generates a video signal as well as a synchronizing signal. The video signal is fed via a make and break contact K1 which normally occupies its lower position, to one of the inputs at an adding circuit S1 whose other input receives the synchronizing signal. The obtained summation signal is fed to a low-pass filter F1 via the contact K2 working synchronously with the contact K1. This low-pass filter is of the type which normally is utilized for the video signal transmission i.e., it has a flat transition from passband to suppressed band. The signal filtered in this manner is fed over a transmission medium TM in which a modulation and demodulation can take place to a discriminator S2 in the receiver where the video signal and synchronizing signals are separated. The synchronizing signal is supplied directly to a picture tube T and the video signal is supplied to the tube T via the lower contact K3 working synchronously with the contacts K1 and K2. At the hitherto described part of the arrangement a picture is consequently obtained in accordance with FIG. 1*c* i.e., a picture which is best adapted for picture objects where not so great demands are made on the resolution of the picture, for example at face-to-face communication. According to the invention the arrangement can be switched over by means of the contacts K1, K2 and K3 whereby the video signal path is changed in the following manner. The video signal produced in the camera tube T is fed to the adding circuit S2 via a compressing amplifier A1 whose transition characteristic is such that signals with a small amplitude are amplified more than signals with large amplitude. Thus a signal according to FIG. 1*a* entails that the amplitude level corresponding to the black fields is to be raised substantially, while the level corresponding to white fields is raised very little or not at all dependent on the characteristics of the amplifier. After summation of the thus compressed video signal and synchronizing signal in the adding circuit S1 the summation signal is fed to the transmission medium TM via a low-pass filter F2 which has a steep transition from passband to suppressed band. In this filter overshoot signals discussed in connection with FIG. 1*b* arise but the effect of these is reduced or completely eliminated because of the compression. At the receiver the compressed signal is fed to the picture tube T from an expanding amplifier A2 via the contact K3 the adjustment of which can be controlled from the transmitter side either via a special adjustment signal or by an instruction to the receiver over the talking connection. The amplifier A2 has such a characteristic that the compression at the transmitter side is compensated and a picture corresponding to the picture object is obtained in the picture tube T.

We claim:

1. In a picture telephone system, apparatus for video signal transmission comprising:

a transmitter, said transmitter including a video camera for transmitting the video signals representing a picture;

means for generating scanning synchronization signals;

an adding circuit having first and second inputs and an output, said first input receiving the scanning synchronization signals;

a first switch having an input for receiving the video signals and first and second mutually exclusive outputs;

means for connecting the second input of said adding circuit directly to the first mutually exclusive output of said first switch;

a video signal compression means connecting the second mutually exclusive output of said first switch to the second input of said adding circuit;

a second switch having an input connected to the output of said adding circuit and first and second mutually exclusive outputs;

a transmitter output terminal;

a first low-pass filter having a flat transition between passband and suppressed band, said first low-pass filter being connected between said transmitter output terminal and the first mutually exclusive output of said second switch;

a second low-pass filter having a steep transition between passband and suppressed band, said second low-pass filter being connected between said transmitter output terminal and the second mutually exclusive output of said second switch;

a receiver, said receiver having a receiver input terminal;

a discriminator means having an input connected to said receiver input terminal, a video signal output and a scanning synchronization signal output for separating the video signals from scanning synchronization signals;

a picture display tube having a scanning synchronization signal input connected to the scanning synchronization signal output of said discriminator means;

a third switch having an input connected to the video signal output of said discriminator means and first and second mutually exclusive outputs;

means for connecting the first mutually exclusive output directly to the video signal input of said picture display tube, and a video signal expander means connecting the second mutually exclusive output of said third switch to the video signal input of said picture display tube;

a signal transmission means interconnecting said transmitter output terminal to said receiver input terminal; and means for synchronizing the operation of said switches so that either all of their first mutually exclusive outputs or all of their second mutually exclusive outputs are operative at any given time.

* * * * *